Patented Mar. 10, 1942

2,275,821

UNITED STATES PATENT OFFICE 2,275,821

FORMALDEHYDE-UREA ADHESIVE

Arthur M. Howald and Kenneth D. Meiser, Toledo, Ohio, assignors to Plaskon Company, Incorporated, Toledo, Ohio, a corporation of Delaware No Drawing. Application May 15, 1940,
Serial No. 335,338

4 Claims. (Cl. 260—69)

The invention relates to formaldehyde-urea adhesives, and particularly to an improved adhesive in solid, water-soluble form.

Aqueous formaldehyde-urea solutions are valuable as adhesives, because the reaction product in such a solution can be converted into infusible and insoluble formaldehyde-urea resin after the adhesive has been applied, to produce a water-resistant bond. An aqueous solution of a formaldehyde-urea reaction product is superior to other adhesives because of the rapidity and ease with which the reaction product can be hardened into the insoluble state after being applied. Plywood that has been glued with such a solution, unlike plywood that has been glued with other thermosetting adhesives, does not need to be subjected to high temperature in a heated press in order to convert the formaldehyde-urea reaction product into the insoluble resin. Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent, such as an ammonium salt of a strong acid which liberates the strong acid and thus causes the formaldehyde-urea reaction product to harden.

However, when an ammonium salt of a strong acid is added to an aqueous solution of a formaldehyde-urea reaction product in sufficient amount to cause the reaction product to harden after the solution has been applied as an adhesive, the hardening takes place so rapidly that there is not sufficient time to apply the solution as an adhesive in ordinary practice.

The principal object of the invention is to provide a solid, water-soluble form of formaldehyde-urea reaction product that, when brought together in aqueous solution with an ammonium salt of a strong acid, remains stable for a time to permit the solution to be applied as an adhesive, and then hardens rapidly to produce a water-resistant bond. More specific objects and advantages are apparent from the description, which merely discloses and illustrates the invention and is not intended to impose limitations upon the claims.

A product embodying the present invention is prepared by bringing together in aqueous solution a formaldehyde-urea reaction product and sufficient ammonia to fix a substantial proportion of the free formaldehyde in the solution, and then, after a substantial proportion of the free formaldehyde in the solution has been fixed, but before the formaldehyde so fixed has been replaced by additional formaldehyde liberated from the reaction product, evaporating the solution to produce a solid product.

When the formaldehyde-urea reaction product and the ammonia are brought together in the aqueous solution, the ammonia reacts with free formaldehyde in the solution to form hexamethylenetetramine. The ammonia may be introduced in the form of gaseous ammonia, ammonium hydroxide, or an ammonium salt.

When an ammonium salt is used, the salt hydrolyzes, and the ammonia from the salt then reacts with the formaldehyde in the solution to form hexamethylenetetramine. If ammonium carbonate is used to provide ammonia in the aqueous solution, the carbonic acid that is liberated can be neglected, because it all disappears during the subsequent drying operation. However, if an ammonium salt of a strong acid, such as ammonium chloride, is used instead of ammonium carbonate, it may be necessary to add a base, such as sodium hydroxide, to prevent the solution from being made appreciably acid by liberation of the hydrochloric acid from the ammonium chloride.

If the solid product is to be stored for a substantial period of time or shipped a substantial distance, the aqueous solution should not be appreciably acid when it is evaporated. The solid product will not keep indefinitely in an acid condition, but will harden and become insoluble.

Formaldehyde and urea react in molar ratios as high as 2:1. However, when 2 or less mols of formaldehyde are reacted with 1 mol of urea in aqueous solution, the resulting solution of the reaction product always contains a small concentration of free formaldehyde. Such free formaldehyde is not a mere uncombinable excess of formaldehyde such as would result from the use of more than 2 mols of formaldehyde for each mol of urea. On the contrary, this small concentration of free formaldehyde is a normal accompaniment of every formaldehyde-urea reaction product in aqueous solution, and is in equilibrium with the reaction product.

The quantity of ammonia used should be sufficient to render the concentration of free formaldehyde in the solution substantially less than the equilibrium concentration normally present in an aqueous solution of the reaction product. The term "free formaldehyde" is used herein to designate formaldehyde that is detectable by the "sulfite test," which may be either free or loosely bound formaldehyde. The "sulfite test" is carried out as follows: After the specimen to be analyzed by the "sulfite test" has been neutralized, an excess of neutralized sodium sulfite solution is added, and titration by means of hydrochloric acid is carried out 40 seconds after the addition of the sodium sulfite solution, to determine the sodium hydroxide content. Each mol of formaldehyde liberates 1 mol of sodium hydroxide.

The amount of ammonia used in carrying out the present invention is preferably sufficient to fix substantially all of the free formaldehyde in the solution. The reaction of the ammonia with the free formaldehyde to form hexamethylenetetramine takes place rapidly, and it is never necessary to wait more than a few minutes to insure the completion of the reaction at ordinary temperatures. Of course, if the evaporation were carried out before the completion of the reaction, the unreacted ammonia would be volatilized and lost.

When a substantial proportion of the normal content of free formaldehyde in the solution has been converted into hexamethylenetetramine, the formaldehyde-urea reaction product begins to liberate formaldehyde gradually, to restore the normal equilibrium between the reaction product and the free formaldehyde in the solution. Therefore, after ammonia has been used to fix free formaldehyde in the solution, the evaporation should be carried out before the formaldehyde so fixed has been replaced by additional formaldehyde liberated from the reaction product. The liberation of a substantial quantity of free formaldehyde from a formaldehyde-urea reaction product in aqueous solution ordinarily takes several hours at room temperatures, but proceeds more rapidly at elevated temperatures. No appreciable liberation of free formaldehyde from a formaldehyde-urea condensation product in aqueous solution occurs in a period of 15 minutes at 40° C.

Vacuum drum-drying or any other method of drying may be employed for the evaporation of the solution, but spray-drying is preferred.

When an ordinary aqueous solution of a formaldehyde-urea reaction product, having the normal or equilibrium content of free formaldehyde, is evaporated, the free formaldehyde appears to go into solid solution in the formaldehyde-urea reaction product, and very little formaldehyde is lost. Then, when the solid reaction product containing such formaldehyde is redissolved in water, a solution is immediately obtained that has substantially the same free formaldehyde content as the solution that was evaporated to produce the solid product. When a hardening agent, such as ammonium chloride, is added to the resulting solution, it hardens too rapidly to permit it to be applied as an adhesive in ordinary practice.

It has been discovered that when the present process is carried out by converting free formaldehyde in an aqueous solution of a formaldehyde-urea reaction product into hexamethylenetetramine, and then evaporating the solution before the formaldehyde so fixed has been replaced by additional formaldehyde liberated from the reaction product, no appreciable liberation of formaldehyde from the reaction product takes place after the drying has been carried out. The drying operation apparently arrests the liberation of formaldehyde. Then, when the resulting solid product is dissolved in water, an aqueous solution is obtained that contains substantially less than the normal concentration of free formaldehyde.

Upon the addition of ammonium chloride to such a solution, there is very little free formaldehyde to react with the ammonia chloride, so that very little hexamethylenetetramine is formed from the ammonium chloride, and very little hydrochloric acid is liberated. This solution containing ammonium chloride is highly valuable as an adhesive, because it will remain stable for as long as 24 hours. This period of stability or liquid life provides plenty of time for applying the solution as an adhesive.

As soon as the solid product embodying the invention has been dissolved in water, a gradual liberation of formaldehyde from the formaldehyde-urea reaction product begins. At the end of the period of stability or liquid life of the solution, the amount of formaldehyde that has been liberated from the reaction product, and has reacted with the ammonium salt, is such that enough of the strong acid has been liberated from the ammonium salt to harden the adhesive.

When a solid product embodying the invention is dissolved in water, a large amount of an ammonium salt of a strong acid may be added to the resulting solution without affecting its stability. Increasing the amount of the ammonium salt of the strong acid merely provides an excess of such salt, which remains unreacted during the period of stability or liquid life of the solution. However, after the solution has been applied as an adhesive, and after the expiration of the period of liquid life, more and more of the strong acid is liberated from the ammonium salt as more and more formaldehyde is liberated from the formaldehyde-urea reaction product.

Thus, although a large amount of the ammonium salt of the strong acid can be added to an adhesive prepared by dissolving the present solid product in water without affecting the stability or liquid life of the adhesive, the use of a large amount of the ammonium salt causes the adhesive to harden rapidly after it has been applied, and to become markedly acid, so that a bond of high water resistance is produced.

For example, an adhesive can be prepared by dissolving a solid product embodying the invention in water and adding ammonium chloride that takes 5 times as long to harden as an adhesive prepared by dissolving an equal amount of any other formaldehyde-urea reaction product in an equal amount of water and adding half as much ammonium chloride. The latter adhesive hardens so rapidly that it cannot be used in ordinary commercial practice. Yet, after the latter adhesive has been applied, the resulting bond takes a week to attain its maximum strength, whereas a bond from the former adhesive attains its maximum strength in 24 hours.

It should be noted that the ammonia used in carrying out the present invention is all converted into hexamethylenetetramine. When a solid product embodying the invention is dissolved in water together with an ammonium salt of a strong acid, the ultimate acidity of the adhesive is not materially affected by the presence of such hexamethylenetetramine, because the latter substance is an extremely weak base. If a strong base were present in the adhesive instead of such hexamethylenetetramine, the adhesive would not harden satisfactorily, even if a large quantity of the ammonium salt of the strong acid were used.

Fillers or extenders may be used with the product of the present invention. After the product has been dissolved in water, it is applied with a hardening agent, such as an ammonium salt of a strong acid. The hardening agent may be incorporated in the solution just before the adhesive is applied, or a solution of the hardening agent may be applied to one of the surfaces to be glued while the adhesive is applied to the other. When the two surfaces to which the two solutions have been applied are brought together, the agent that has been applied to one surface acts to harden the formaldehyde-urea reaction product that has been applied to the other surface.

After an adhesive embodying the invention has been incorporated with a hardening agent and applied, the assembled surfaces to be glued can be held at ordinary temperatures while the adhesive hardens. Plywood panels and similar articles may be placed under pressure while the adhesive hardens. A heated press can be used to secure quick hardening of the adhesive, or plywood panels, after being clamped together, may be stored at an elevated temperature to hasten the hardening.

Although a solid product embodying the invention, after being dissolved in water, is particularly useful as an adhesive, the resulting solution can be used as a coating composition or impregnating composition, or for other purposes.

In accordance with the invention, the formaldehyde-urea reaction product and the ammonia may be brought together in aqueous solution in any desired manner. Any of the ordinary water-soluble reaction products of formaldehyde and urea may be dissolved in an aqueous solution of ammonium hydroxide or an ammonium salt, such as ammonium borate, or an aqueous solution of a formaldehyde-urea reaction product may be mixed with a solution of ammonium hydroxide or an ammonium salt.

*Example*

A solution of a formaldehyde-urea reaction product may be prepared as follows: 1 mol of urea is added to a 37 per cent aqueous solution containing 2 mols of formaldehyde that has been brought to pH 4.5–5.0 by means of sodium hydroxide. The solution is then gently refluxed long enough (about 1 hour) to carry the formaldehyde-urea reaction to the desired stage, after which the solution is neutralized. It may then be diluted with water, or evaporated under vacuum to the desired concentration.

When the solution is at a temperature of 40° C., it is analyzed for free formaldehyde by the sulfite test, and 2 mols of aqueous ammonia are added for each 3 mols of free formaldehyde. 10 minutes after the addition of the aqueous ammonia, the solution is evaporated by spray-drying or vacuum drum-drying, to produce a solid product. An adhesive may be prepared by dissolving 100 parts by weight of the resulting product in water, together with 2 parts of ammonium chloride.

Various embodiments of the invention may be devised to meet various requirements.

Having described our invention, we claim:

1. A method of preparing an adhesive that comprises bringing together in aqueous solution a formaldehyde-urea reaction product and sufficient ammonia to fix a substantial proportion of the free formaldehyde in the solution, and then completely evaporating the solution after a substantial proportion of the free formaldehyde in the solution has been fixed but before the formaldehyde so fixed has been replaced by additional formaldehyde liberated from said reaction product, to produce a solid water-soluble product that, when brought together in aqueous solution with an ammonium salt of a strong acid, forms an adhesive having delayed-hardening properties.

2. A method of preparing an adhesive that comprises bringing together in aqueous solution a formaldehyde-urea reaction product and sufficient ammonia to fix substantially all of the free formaldehyde in the solution, and then completely spray-drying the solution after substantially all of the free formaldehyde in the solution has been fixed but before the formaldehyde so fixed has been replaced by additional formaldehyde liberated from said reaction product, to produce a solid water-soluble product that, when brought together in aqueous solution with an ammonium salt of a strong acid, forms an adhesive having delayed-hardening properties.

3. A solid water-soluble product prepared in accordance with the method of claim 1 that, when brought together in aqueous solution with an ammonium salt of a strong acid, forms an adhesive having delayed-hardening properties.

4. A solid water-soluble product prepared in accordance with the method of claim 2 that, when brought together in aqueous solution with an ammonium salt of a strong acid, forms an adhesive having delayed-hardening properties.

ARTHUR M. HOWALD.
KENNETH D. MEISER.